United States Patent [19]

Sehgal

[11] Patent Number: 4,577,501
[45] Date of Patent: Mar. 25, 1986

[54] PROBE COIL SNUBBER

[75] Inventor: Tyag R. Sehgal, Cincinnati, Ohio

[73] Assignee: General Electric Company, Cincinnati, Ohio

[21] Appl. No.: 611,277

[22] Filed: May 17, 1984

[51] Int. Cl.⁴ ............... F16F 1/00; F16F 13/00; F16F 7/00
[52] U.S. Cl. .................... 73/577; 174/69; 267/135
[58] Field of Search ............ 174/69; 267/135, 615

[56] References Cited

U.S. PATENT DOCUMENTS 2,571,422  10/1951  Cole et al. ............... 201/63
2,955,149  10/1960  Gubernick ............... 174/69
4,132,114  1/1979  Shah ................... 73/343 R

FOREIGN PATENT DOCUMENTS 1123004  2/1962  Fed. Rep. of Germany ........ 174/69

OTHER PUBLICATIONS

"Mechanical Restraints: What They Do and How They Work," *Design News*, 4-23-84, pp. 77 and 78.

*Primary Examiner*—Howard A. Birmiel
*Attorney, Agent, or Firm*—Gregory A. Welte; Derek P. Lawrence

[57] ABSTRACT

The present invention utilizes a wire wool slug packed inside a helical coil of an aircraft engine sensor in order to reduce vibration damage to the coil.

3 Claims, 5 Drawing Figures

PROBE COIL SNUBBER

The present invention relates to the inhibition of fatigue cracks in metal and, more particularly, to the inhibition of cracks occurring in a helical coil which acts as a coupling to a sensing probe in a gas turbine engine.

BACKGROUND OF THE INVENTION

FIG. 1 illustrates two components contained within a gas turbine engine (not shown), namely, a first, cylindrical, component 3 and a second component 6 separated by a gap 9 from the first component 3. The second component 6 bears hole 12 having a counterbored recess 15. A mast 18 extends through the hole 12 and contains a shoulder 21 which fits into the counterbored recess 15. The mast 18 supports a probe 24 which produces a signal which must be transmitted across the gap 9.

The signal transmission is commonly accomplished through a tube 27, which extends through the mast 18 and reaches the gap 9. If the signal is a pressure signal, the transmission takes the form of a change in pressure in the tube 27 which is read by sensing equipment (not shown). If the signal is electrical, as from a temperature sensor, the transmission is carried along wires contained within the tube 27. Sensing equipment (again, not shown) reads the electrical signal.

A problem in aligning the cylinder 3 with the hole 12 arises from two causes. One, manufacturing inaccuracies and stack-up tolerances almost inevitably cause the cylinder 3 and the hole 12 to become noncoaxial with respect to axis 11. Two, even if the cylinder 3 and the hole 12 are successfully manufactured to be coaxial, differential thermal expansion during engine operation causes the hole 12 and the cylinder 3 to become misaligned.

The misalignment is accommodated by the addition of a helical coil 30 in the tube. The helical coil accommodates dimensional changes occurring between the cylinder 3 and the second component 6 through bending. One end 33 of the helical coil 30 is affixed to a bushing 36 which is brazed into the cylinder 3 at points 39. The other end 42 of the helical coil 30 is affixed to the inside of the shoulder 21.

During manufacture, the helical coil 30 is compressed slightly during installation into the position shown in FIG. 1. Thus, the helical coil 30 acts as a spring to urge the shoulder 21 into contact with the bottom 45 of the recess 15. (The shoulder 21 functions to prevent the mast 18 from falling out of the hole 12 as shown by phantom mast 48 in the event that the tube 27 should break at point 51.)

However, the use of the helical coil 30 has raised a problem. Applicant has found that the helical coil 30 sometimes cracks at elbows 53. These elbows 53 have sharp curvature (approximately 90°) and are termed inflection points at which the tube 27 changes direction from traveling along a helix to traveling along the axis 11.

OBJECTS OF THE INVENTION

It is an object of the present invention to provide a new and improved apparatus for crack inhibition.

It is a further object of the present invention to provide new and approved apparatus for the inhibition of crack formation in a near-90° bend in tubing used in a gas turbine engine.

SUMMARY OF THE INVENTION

In one form of the present invention, a wire wool slug is packed into a helical coil to reduce breakage caused by vibration.

DETAILED DESCRIPTION OF THE INVENTION

Applicant believes that vibration of the helical coil 30 is the chief cause of cracking at elbows 53. In contrast, Applicant does not believe that thermal cycling of these elbows 53 nor the stresses resulting from misalignment of the cylinder 3 and component 6 are major causes of the cracking. Based on this, Applicant has developed a model of vibrational behavior and the model is shown in FIG. 3.

Figure 1:
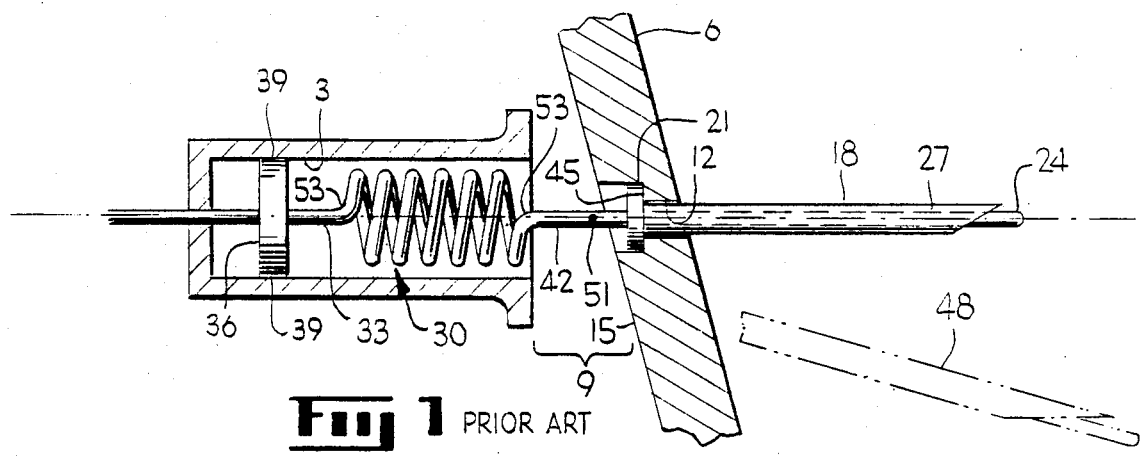
FIG. 1 illustrates a helical coil 30 in a tube used in the prior art.
Figure 3:
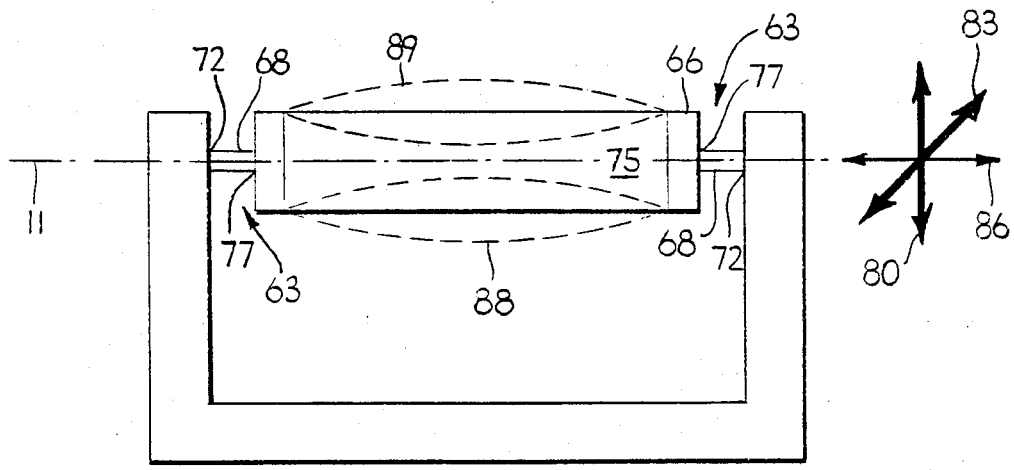
FIG. 3 illustrates a model used to describe the behavior of the apparatus of FIG. 1.

FIG. 3 illustrates a frame 60 supporting two T-mounts 63. The crossbars 66 of the T-mounts 63 are rigidly connected to the stems 68 of the T-mounts 63, which are in turn rigidly connected to the frame at points 72. An elastic member 75 extends between the crossbars 66. The elastic member 75 is considered analogous to the helical coil 30 in FIG. 1 and the junction of the stems 68 to the crossbars 66 are considered analogous to the elbows 53.

Figure 3A:
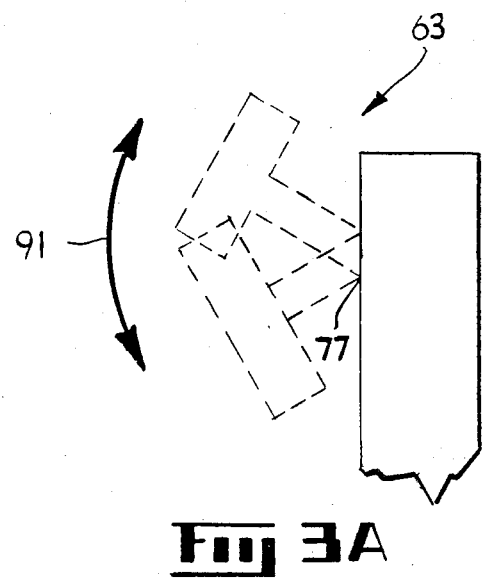
FIG. 3A illustrates rotation of the T's 77 of FIG. 3.

Three axes of vibration 80, 83 and 86 are shown in FIG. 3. Axis 86 is generally coaxial with axis 11 in FIG. 1. Applicant believes that no significant vibration occurs along this axis 86. However, as to axes 80 and 83, Applicant believes the opposite and that significant vibration does in fact occur along these two axes. This is indicated by the larger arrows appearing along these axes. The vibration causes the elastic member 75 to vibrate. That is, vibration along axis 80 causes the elastic member to deform and occupy dashed position 88 and 89. This vibration causes the crossbar 66 to rotate as shown by arrows 91 in FIG. 3A and to thus apply stress to the junctions 77 in FIGS. 3 and 3A.

Figure 2:
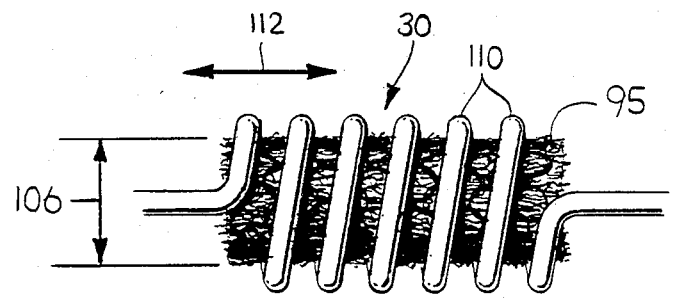
FIG. 2 illustrates one form of the present invention.
Figure 2A:
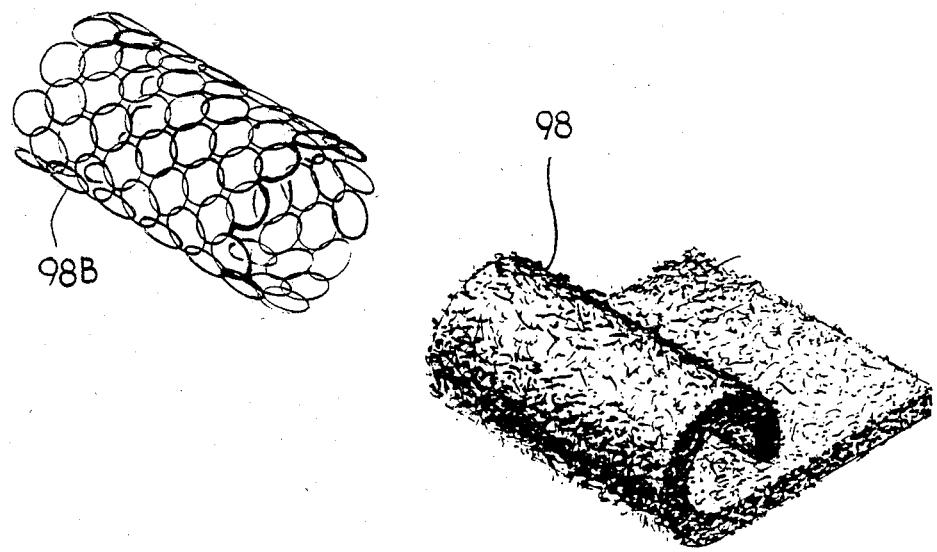
FIG. 2A illustrates the construction of the wire wool slug 95 of FIG. 2.

Applicant reduces the stress by inserting a packing or slug 95 of wire wool within the helical coil as shown in FIG. 2. The packing is constructed of a wire wool which is rolled into a cylinder, jelly-roll fashion as shown in FIG. 2A. The inner cylinder is then surrounded by a knitted sheath 98B in FIG. 2A. The two-piece slug (i.e., the inner, rolled piece surrounded by the outer sheath) is referred to as a snubber and is available from Matex Corporation, New Jersey. In particular, a snubber of Catalog No. 51-0116-4752 was formed and knitted to fill the helical coil 30 having an inner diameter (dimension 106 in FIG. 2) of 0.395 inch. The density of such a snubber of 0.395 inch diameter is 0.47 plus or minus 0.05 oz/linear foot.

Applicant theorizes that the wire wool slug 95 reduces vibration of the coil 30 by stiffening the coil against vibrations which occur transverse to the axis 86. That is, the modulus of elasticity of elastic member 75

(the analogue to helical coil 30) in FIG. 3 is increased so that the amplitude of vibrations along axes 80 and 83 (which are perpendicular to the axis 86 and thus termed transverse) are reduced.

This is in distinction to another possible means of vibration reduction, namely damping, wherein vibrational movement does in fact occur because of a force applied to the helical coil 30. In such a case, the initial displacement (for example, to dashed position 88 in FIG. 3) causes the wire wool slug 95 in FIG. 2 to deform, thus absorbing some energy in the deformation process as well as dissipating some energy as friction at the points of contact 110 between the wire wool slug and the coil 30. The energy dissipation resulting from deformation and friction reduces the displacement.

One reason Applicant believes that this latter mechanism is not the dominant mechanism is that the wire wool slug, once installed, remains in position after a period of vibration. If actual flexing and displacement of the coil 30 should occur, Applicant believes that the wire wool slug 95 would be displaced in the directions of arrows 112 in FIG. 2, thus possibly falling out of the coil.

An invention has been described wherein transverse bending of a helical coil is reduced by stiffening the coil by the insertion of a wire wool slug. Applicant believes that the evidence indicates that the wire wool slug dampens vibration by increasing the rigidity of the coil as a whole against transverse deflection, and not by dissipation of the motion of vibration as heat through friction.

Numerous modifications and substitutions can be undertaken without departing from the true scope of the present invention.

What is desired to be secured by Letters Patent is the invention as defined in the following claims.

I claim:

1. In the coil of a coiled tube in a gas turbine engine which provides a communication conduit leading to a sensor, the improvement comprising:
    a stiffening element contained within the coil for inhibiting bending of the coil.

2. In a coiled tube in a gas turbine engine which provides a communication conduit leading to a sensor, the improvement comprising:
    a wire wool slug contained within the coil for increasing the modulus of elasticity of the coil.

3. A system in a gas turbine engine for supporting a sensor comprising:
    (a) a first support for supporting a first end of a generally helical coil,
    (b) a second support for supporting a second end of the generally helical coil, the coil providing a communication conduit from the first support to the second support,
    (c) a mast supported by the second support for receiving an extension of the helical coil, and
    (d) a slug comprising wire wool contained within the helical coil for inhibiting vibration of the coil.

* * * * *